United States Patent [19]

Sugasawara et al.

[11] Patent Number: 4,938,322
[45] Date of Patent: Jul. 3, 1990

[54] MULTI-DISC DAMPER USING VISCOUS FLUID

[75] Inventors: Seiji Sugasawara; Ken Tsuneki; Kazuyoshi Ohshima; Youjirou Nakayama; Tatsuya Hayakawa; Seiichiroh Tamura, all of Tokyo, Japan

[73] Assignee: Sugatsune Industrial Co., Ltd., Tokyo, Japan

[21] Appl. No.: 310,721

[22] PCT Filed: Jun. 8, 1988

[86] PCT No.: PCT/JP88/00550
§ 371 Date: Feb. 10, 1989
§ 102(e) Date: Feb. 10, 1989

[87] PCT Pub. No.: WO88/09884
PCT Pub. Date: Dec. 15, 1988

[30] Foreign Application Priority Data

| Jun. 10, 1987 | [JP] | Japan | 62-144881 |
| Jun. 10, 1987 | [JP] | Japan | 62-144882 |
| Jun. 22, 1987 | [JP] | Japan | 62-154794 |
| Jul. 1, 1987 | [JP] | Japan | 62-164665 |
| Jul. 1, 1987 | [JP] | Japan | 62-164666 |
| Jul. 8, 1987 | [JP] | Japan | 62-170713 |

[51] Int. Cl.$^5$ .............................. F16D 57/02
[52] U.S. Cl. .......................... 188/290; 16/51; 192/58 B; 192/58 C
[58] Field of Search ............ 188/290, 293, 295, 296; 192/58 B, 58 C; 16/51, 54

[56] References Cited

U.S. PATENT DOCUMENTS

| 923,565 | 6/1909 | Newcomb | 192/58 B |
| 2,514,137 | 7/1950 | O'Connar | 188/290 |
| 2,959,252 | 11/1960 | Jamiesas | 188/276 |
| 3,119,469 | 1/1964 | Farr et al. | 188/276 |
| 3,385,408 | 5/1968 | Manning | 188/290 X |
| 3,651,903 | 3/1972 | Butler et al. | 188/290 |
| 4,683,997 | 8/1987 | Stockmar et al. | 192/58 C |

FOREIGN PATENT DOCUMENTS

| 1804033 | 5/1920 | Fed. Rep. of Germany | 188/290 |
| 53-127976 | 11/1978 | Japan . | |

Primary Examiner—George E. A. Halvosa
Attorney, Agent, or Firm—Foley & Lardner, Schwartz, Jeffrey, Schwaab, Mack, Blumenthal & Evans

[57] ABSTRACT

A damper comprising within a casing filled with viscous fluid a number of movable discs to be moved in response to the transmitted external force and a number of not interlocked fixed discs arranged in an alternative arrangement, wherein both movable and fixed discs are axially deflectable can maintain even clearances between the movable and the fixed discs due to the alignment effect of the discs without undergoing unreasonable stress that can damage the discs. The allowable limit of deflection of the fixed and movable discs can be made adjustable so as to modify the total drag of the damper. Sources of resilient restoring force may be provided to enhance the capability of adjustment. Moreover, the number or the size of the movable and/or the fixed discs can be made alterable to effectively modify the drag of the damper.

3 Claims, 14 Drawing Sheets

FIG.2
FIG.3
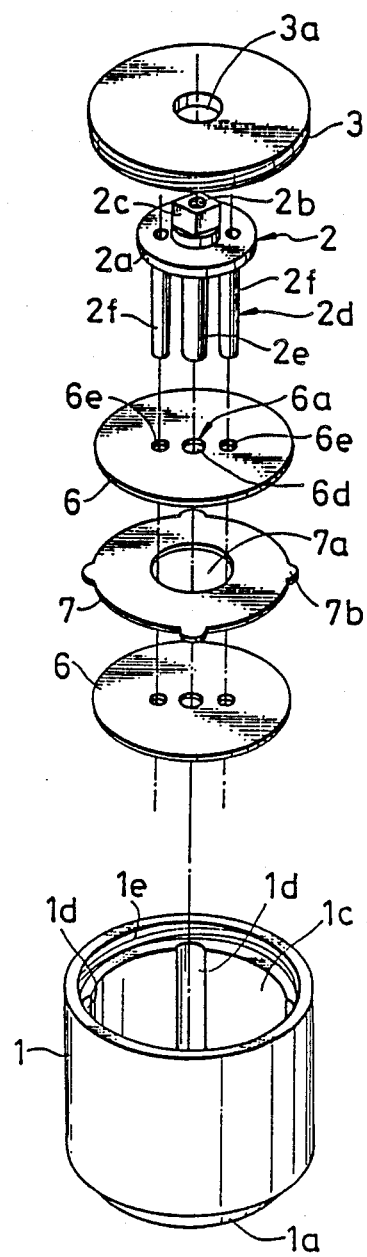
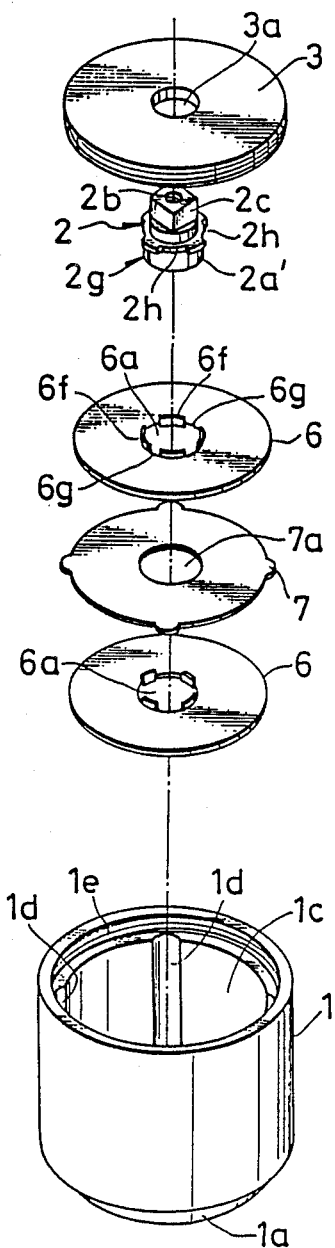

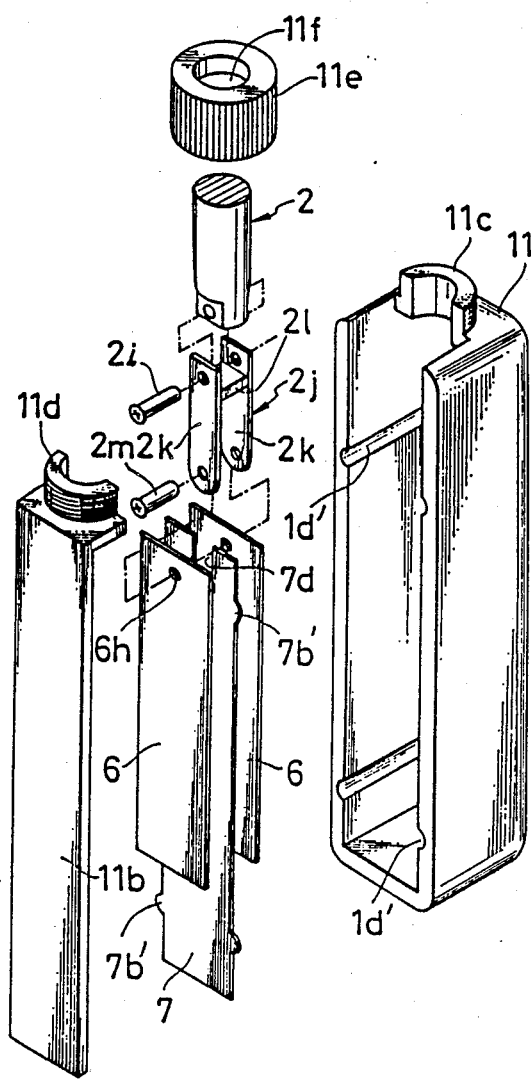
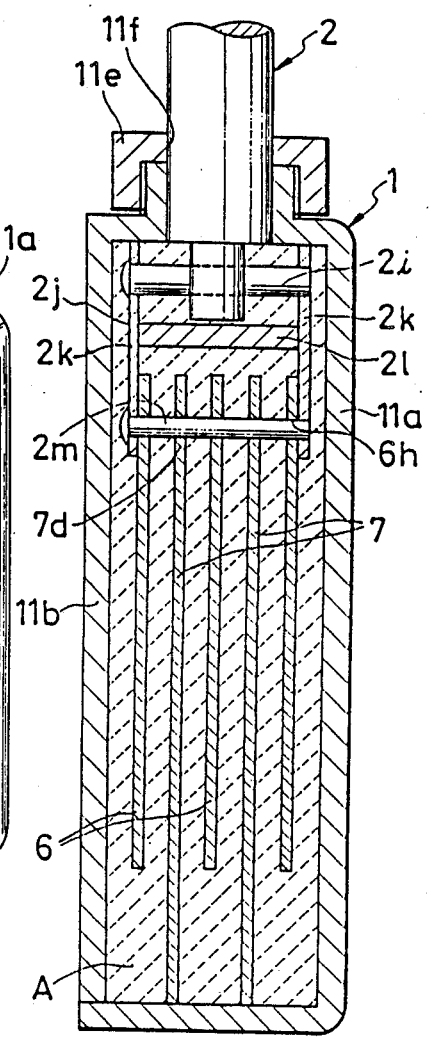

FIG.13 a  FIG.13 b
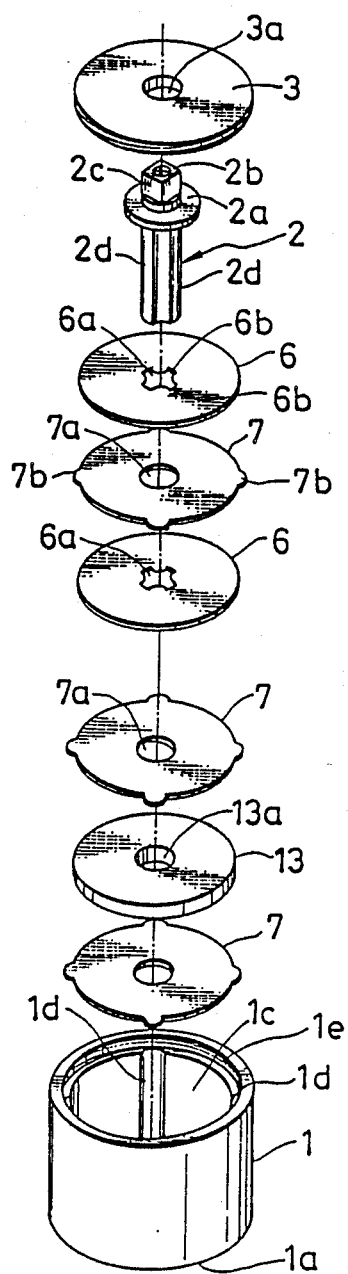
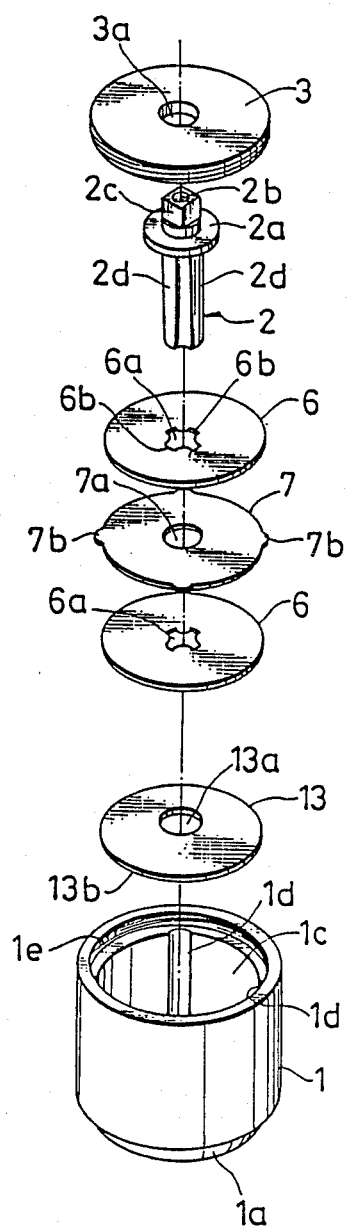

MULTI-DISC DAMPER USING VISCOUS FLUID

FIELD OF TECHNOLOGY

This invention relates to a damper using a high-molecular viscous fluid material such as polyisobutylene with a view to utilize its high viscous drag against shearing force for buffering or damping the external force, thereby providing a variety of potential applications.

TECHNICAL BACKGROUND

It is well known that a conventional damper utilizes the turbulence of the oil it contains to absorb the shock imparted by an external force. Such turbulence occurs when the oil passes through narrow slits provided within the damper as oil is pressed by the external force.

However, with such a damper, high precision is required for the make of the slits to accurately generate a required resisting force in order to accurately produce the required damping effect. Morever, as oil cannot be compressed when a strong external force is abruptly applied to it, the external force is apt to be directly received by the strucural members the damper is supposed to protect. To overcome this problem, a damper is normally designed to have an excessively high strength against external force, making in turn its overall size very bulky. Besides, the slits are liable to become narrow as dust and other foreign matters are caught by the slits and eventually clogged to completely block the flow of oil.

In order to eliminate these disadvantages of the damper of the conventional designa as described above, an improved damper has been proposed, which basically comprises two independent solid members arranged in such a manner that they are movable relative to each other and have surfaces located vis-a-vis and close to each other and a highly viscous liquid material filled therebetween so that it can provide resistance against external force due to the viscous drag of the liquid material against shearing force that can be generated without raising the internal pressure of the liquid when an external force is applied thereto.

A typical damper which was realized in relatively early days on the basis of this design a concept comprises a casing in which a certain number of movable discs are radially and perpendicularly fitted to a rotary shaft and a same number of fixed discs are fitted to the casing in such a manner that the movable discs and the fixed discs are arranged alternatively with an appropriate clearance between any two adjacent discs and the oil which is contained within the casing fills the spaces between the discs.

With a damper having a configuration as described above, when an external force is applied to the rotary shaft, the movable discs fitted thereto and the fixed discs fitted to the casing are caused to move relative to each other and the viscous liquid filling the spaces between the discs generates viscous drag against the shearing action of the external force to bring forth the overall effect of the damper. However, with such an arrangement, the distance between the two adjacent discs has to be precisely identical for all the discs. If not, the portion of the viscous fluid found between a pair of discs having a relatively small clearance generates a larger viscous drag than the portion of the fluid found between a pair having a relatively large clearance, causing an unreasonably large stress to occur in the are having a large viscous drag that can eventually damage the damper, since the discs are rigidly fitted either to the casing or the rotry shaft and the clearance between a pair of adjacent discs and are not adjustable.

Consequently, manufacture of such a damper requires a considerable high precision. Moreover, such a damper is not capable of altering its damping effect by altering the surface area of the discs because they are rigidly fitted to the supporting members and not accessible from outside, while the amount of viscous drag is proportional to the surface area of the adjacent discs which are facing to each other. This means that if a damper having a different damping effect is needed, a completely new damper has to be provided.

In order to eliminate the drawbacks of the above described damper of the early days, a rotational damper using a plurality of discs and a viscous fluid material has been proposed (Japanese Utility Publication No. 57-39664). FIGS. 22a and 22b illustrate a damper according to the disclosed utility design.

This damper comprises, as in the case of the above described damper of the early days, cylindrical casing a having rotatable shaft c along its longitudinal axis which is rotated when an external force is applied to a pivotable arm b fitted to said rotatable shaft c. A plurality of movable discs d, d, . . . are arranged radially and perpendicularly to said rotary shaft c and rigidly fitted thereto by welding or some other means, while a plurality of fixed discs e, e, . . . are fitted to casing a not rigidly but through engagement of grooves f, f, . . . of said fixed discs e, e, . . . and a pair of longitudinal ridges g, g so that while fixed discs e, e, . . . are blocked against rotating movement, they can be deflected in the axial direction of the damper within a certain limit as most clearly seen in FIG. 22(a). The space within casing a is filled with viscous fluid as in the case of the damper described earlier.

This improved damper is advantageous in that it is free from any damage if an unreasonable force is applied from outside to fixed discs e, e, . . . in the axial direction, because said fixed disc e, e, . . . are so arranged that they can be axially deflected and thereby absorb the external force and that even when there is a fixed disc e which is located significantly closer to one of its adjacent movable discs than to the other and hence generates a viscous drag against shearing force relatively larger than the viscous drage generated between disc e and the other adjacent movable disc as movable discs d, d, . . . are rotatingly moved relative to fixed discs e, e, . . . , said fixed disc e is automatically pushed away to come closer to the other adjacent movable disc having a relatively small viscous drag between itself and said fixed disc e. By this action (so-called alignment effect), each of fixed discs e, e, . . . always tends to take a position where it evenly divides the space between two neighboring movable discs to generate a viscous drag which is equal to those generated by the rest of the fixed discs, thereby preventing any possible damages from occuring due to abnormally large viscous drags that are loacally generated.

However, this improved damper also has certain drawbacks. Firstly, since movable discs d, d, . . . are rigidly fitted to rotary shaft c, they are required to be located with high precision to ensure an evenly distributed viscous drag. Secondly, since the distance between any adjacent movable disc is not adjustable, the surface area of each fixed disc e needs to be altered, if the magnitude of the overall viscous drag is required to be changed.

Therefore, alteration of the surface area of fixed disc e, e, ... is practically not feasible because such an operation requires dismantling of the damper assembly and disengagement as well as reengagement of the fixed discs with axial ridges g, g. A completely different damper should be provided to realize a viscous drag which is different from that of the original damper.

Moreover, since movable discs d, d, ... are rigidly fitted to rotary shaft c, alteration of the distance between any given movable disc d and the adjacent disc e from outside is practically not feasible although such capability of alteration is indispensable for a damper that can meet the practically requirement of adjusting its viscous drag within a certain limit.

Consequently, if a variable damping effect is required for a given application, there have to be prepared a number of dampers having different damping effects that satisfy the requirements by providing casings, movable discs and fixed discs with different sizes. With such an arrangement, a damper having a large clearance between the adjacent movable fixed discs or one having a relatively small surface area of the movable and fixed discs may be used if a small damping effect is required, whereas a damper having a small clearance between the adjacent movable and fixed discs or one having a relatively large surface area of the movable and fixed discs may be used for a relatively small viscous drag.

A damper of the type as described above is also accompanied by another major drawback. Any viscous fluid material contained in the damper loses its vicosity and hence its viscous drag against shearing force to some extent as the ambient air temperature rises in summer, whereas it obtains an additional viscosity and hence an additional viscous drag to certain extent in winter when the temperature falls. So, a damper that operates normally in winter can have a poor damping effect in summer and, if it is used as a door check, come to be a defective device that can not effectively absorb shocks and allow the door to bang when it is shut.

It is therefore an object (the first object) of the present invention to provide a damper which is designed on the basis of a completely new concept of using fixed discs and movable discs that can be axially deflected, a concept which is totally different from that of the above described conventional dampers comprising both fixed and movable discs respectively rigidly fitted to a casing and a rotary shaft or axially deflectable fixed discs fitted to a casing and movable discs rigidly fitted to a rotary shaft, where rigidly fitted members are involved in any case. According to this new concept, not only the fixed disc but also the movable discs are so arranged that they can be axially deflected. Thus, when the movable discs are subjected to an external force in the form of rotation or traction so that they come to form clearances with their adjacent fixed discs having distances which are different from one another, a flow of the viscous fluid occurs within the damper to bring forth the above-mentioned alignment effect (an effect of viscous fluid to flow from areas where the viscous drag is low to areas where the drag is high, or areas where the clearance of adjacent discs is narrowed, to equalize the clearances) and equalize the clearance for all the discs. With such an arrangment, a damper which is free from damage due to abnormally high local viscous drags can be manufactured without requiring high precision.

It is another object (the second object) of the present invention to provide a damper comprising deflectable fixed and movable discs as described above by referring to the first object, said damper further having an axial total effective length that can be adjusted from outside within a predetermined limit to alter the clearance of the adjacent discs and hence the overall damping effect of the damper rapidly and easily.

It is a further object (the third object) of the present invention to provide a damper as described above by referring to the second object, said damper further comprising resilient members capable of restoring the axial total effective length of the damper when it is axially compressed to ensure a smooth initial action of the damper and an easy adjustment of its effects.

It is a still further object (the fourth object) of the present invention to provide a damper, unlike dampers as described above by referring to the second and third objects and having a means for adjusting the viscous drag, comprising a means for altering the number of movable discs which are rotated with a rotary shaft through an operation conducted from outside to adjust the overall drag of the damper and a means for replacing all the replaceable fixed and movable discs with those having a different surface area easily and rapidly to alter the nominal viscous drag of the damper.

It is a still further object (the fifth object) to provide a damper comprising axially deflectable fixed and movable discs whose clearances can be easily altered simply by altering the axial total effective length of the damper from outside to adjust the overall drag of the damper and a means for replacing the replaceable fixed and movable discs with those having a different surface area to alter the nominal drag of the damper, said damper further comprising a deformable feeler element sensitive to temperature change within the casing at a location where said element is effectively thermally deformed to automatically maintain the predetermined level of drag of the damper regardless of temperature change without necessity of adjustment by operators.

It is a still further object (the sixth object) of the present invention to provide a damper, unlike the one having a feeler element as described above by referring to the fifth object, comprising movable discs and fixed discs either or both of which are made of a thermally deformable material which is sensitive to temperature change to effectively utilize the thermal deformation of the discs made of such a material to maintain the predetermined level of drag of the damper regardless of temperature change without necessity of adjustment by operators.

It is a still further object (the seventh object), of the present invention to provide a damper comprising, is addition to the features of the one as described by referring to the fourth object, movable and fixed discs constantly under the effect of a resilient external force, either or both of said movable and fixed disc being made of a thermally sensitive and deformable bimetal to effectively utilize thermal deformation of the bimetal to maintain the predetermined level of drag of the damper, regardless of temperature change without necessity of adjustment by operators.

DISCLOSURE OF THE INVENTION

According to the present invention, the first object of the inventionis achieved by providing a damper comprising within a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are engaged with the casing in such a manner that they are not movable radially or in the direction of rotation or traction but axially or longitudinally deflectable.

With such an arrangement, when the rotary shaft is subjected to a rotary force or a linear tractive force, the movable discs engaged or coupled with the rotary shaft are rotated or tracted in the viscous fluid, thereby generating a viscous drag against shearing force of the fluid found between the movable discs and the fixed discs which are not interlocked with the rotary shaft for the movement of the movable discs to buffer the applied external force so that the assembly operates as a damper. At this stage, thanks to the alignment effect, a flow of the viscous fluid occurs toward the areas where the viscous drag against shearing force is relatively high so that, if there are variations of clearances between the movable and fixed discs, they are axially moved by the flow of the fluid that runs into the areas where the clearance between the movable disc and the fixed disc is small and hence the viscous drag against shearing force is high in such a manner that the movable and fixed discs are axially deflected to equalize all the clearances between the adjacent discs throughout the total effective length of the damper, thereby eliminating any abnormal conditions where unreasonable drags are locally generated to damage the members of the damper assembly.

The second object of the present invention is achieved by providing a damper comprising within a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movable because of the engagement with the casing but axially deflectable, that the movable discs are also axially deflectable and that the axial total effective length of the damper can be adjusted within a predetermined limit to alter the clearance of the adjacent movable and fixed discs by operating an adjusting member that can be operated from outside.

A damper as described above by referring to the second object of the invention has not only an identical effect as a damper that achieves the first object, but also an effect of adjusting its damping capacity by altering the axial total effective length of the damper by means of the adjusting member so that the total effective length and accordingly the clearance between the adjacent discs may be decreased to increase the viscous drag or increased to decrease the viscous drag.

The third object of the present invention is achieved by providing a damper comprising with a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movable because of the engagement with the casing but axially deflectable, that the movable discs are also axially deflectable, that the axial total effective length of the damper can be adjusted within a predetermined limit to alter the clearance of the adjacent movable and fixed discs by operating an adjusting member that can be operated from outside and that resilient members capable of restoring the axial total effective length of the damper when it is axially compressed provided to ensure a smooth initial action of the damper and an easy adjustment of its effects.

A damper as described above by referring to the third object of the invention has not only an identical effect as a damper that achieves the second object, but also, thanks to the resilient members, and effect of quickly restoring its original axial total effective length to increase the clearance between the movable and fixed discs when the damper has been axially compressed to decrease the axial effective length and then released from the compressive force and of preventing the discs from totally losing their clearance even when the damper is left in an idle condition without any external rotating force applied thereto and therefore keeping its viscous fluid in a desired condition so that it can smoothly exert its damping function whenever an external force is applied thereto.

The fourth object of the invention is achieved by providing a damper comprising within a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movably because of the engagment with the casing but axially deflectable, that the movable discs are also axially deflectable, that said rotary shaft is provided with a locking portion having teeth that comes to engagement with movable discs and a nonlocking portion that goes through the bottom of the casing and that the rotary shaft is made to be axially movable by means of a rotary adjusting member provided on the bottom of the casing and coupled to said nonlocking portion so that the nonlocking portion goes into or comes out of the casing according to the axial movement of the rotary shaft in such a manner that the movable discs can come off from the locking portion one by one starting from the one situated closest to the nonlocking portion or inversely come into engagement with the locking portion in accordance with the movement of the shaft.

A damper as described above by referring to the fourth object of the invention has not only an identical effect as a damper that achieves the first object, but also an effect of significantly decreasing the drag of the damper that can be achieved by operating the rotary adjusting member from outside to move the rotary shaft upward and accordingly the nonlocking portion thereof into the casing so that the movable disc situated closest to the nonlocking portion comes off from the locking portion into the area of nonlocking portion and into a state where it is not interlocked with the rotary shaft any more and loses its function as a source of viscous drag realized with the fixed disc located immediately above it. In this manner the drag of the damper can be gradually reduced by bringing the movable discs one by one out of the locking portion. As a matter of course, the drag of the damper can be increased by inversely bringing the idle movable discs one by one into engagement with the locking portion.

The fifth object of the present invention is achieved by providing a damper comprising within a casing a number of movable discs arranged on a rotary shaft, said movable discs being rotated or tracted in accordance with the rotary or tractive movement of the rotary caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movable because of the engagement with the casing but axially deflectable, that the movable discs are also axially deflectable and that one or more than one deformable feeler elements are provided at the bottom of the casing or between the movable and fixed discs, said deformable feeler elements being deformed to push up the discs so that the clearance between the movable and fixed discs is narrowed when temperature rises within the casing and inversely to lower the discs so that the clearance is widened when temperature falls.

A damper as described above by referring to the fifth object of the invention has not only an identical effect as a damper that achieves the first object, but also an effect of compensating any reduction of the drag of the damper caused by the decreased viscosity due to a temperature rise in summer through deformation of the feeler element to narrow the distance between the adjacent movable and fixed discs, thereby eliminating the drawback of fluctuation of the drag in response to the fluctuation of ambient temperature.

The sixth object of the present invention is achieved by providing a damper comprising within a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movable because of the engagement with the casing but axially deflectable, that the movable discs are also axially deflectable and that all or part of both or either of the movable discs and the fixed discs are made of a material which is deformed with change of temperature to narrow the clearance between the movable and fixed discs when temperature rises and inversely to widen the clearance when temperature falls.

A damper as described above by referring to the sixth object of the invention has not only an identical effect as a damper that achieves the first object, but also as in the case of a damper that achieves the fifth object an effect of compensating any reduction of the drag of the damper caused by the decreased viscosity due to a temperature rise in summer through expanding deformation of both or either of the movable discs and the fixed discs to narrow the distance between the adjacent movable and fixed discs, thereby eliminating the drawback of fluctuation of the drag in response to the fluctuation of ambient temperature.

The seventh object of the present invention is achieved by providing a damper comprising within a casing a number of movable discs arranged on a rotary shaft, said movable discs being rotated or tracted in accordance with the rotary or tractive movement of the rotary shaft caused by external force, a number of fixed discs provided in an alternative arrangement with said movable discs in such a manner that they are not interlocked with the rotary shaft for rotary or tractive movement and a viscous fluid material filling the space between the movable and fixed discs, said damper being characterized by that said fixed discs are not radially movable because of the engagement with the casing but axially deflectable, that the movable discs are also axially deflectable, that the movable and fixed discs are constantly subjected to a resilient external force tending to narrow the clearance between the movable and fixed discs and that both or either of the movable discs and fixed discs are made of a bimetal which is deformed with change of temperature to widen the clearance between the movable and fixed discs against said resilient external force when temperature falls and inversely to narrow the clearance under the influence of said resilient external force when temperature rises.

A damper as described above by referring to the seventh object of the invention has not only an identical effect as a damper that achieves the first object, but also an effect of reducing the degree of the rise of the drag due to the increase of the viscosity of the viscous fluid caused by temperature fall in winter because of deformation of the bimetal to widen the clearance between the movable and fixed discs and of increase of the total effective length of the damper that allows axial adjustment of the movable and fixed discs and compensating the decrease of the viscosity of the viscous fluid caused by temperature rise in summer because of restoration of the original shape of the discs of bimetal to shorten the total effective length of the damper and to narros the clearance between the adjacent movable and fixed discs, thereby eleiminating any abnormal conditions that may be caused to the danger by abrupt changes of ambient temperature.

BRIEF DESCRIPTION OF THE DRAWINGS

FIG. 1b is an exploded perspective view of the embodiment of FIG. 1a.

FIGS. 2 and 3 are exploded perspective views similar to FIG. 1b showing two other embodiments designed to achieve the 1st object of the invention.

FIG. 4a is a longitudinal sectional view showing the principal part of an embodiment of the traction damper according to the invention.

FIG. 4b is an exploded perspective view of the embodiment of FIG. 4a.

FIG. 6b is an exploded perspective view of the embodiment of FIG. 2a.

FIGS. 13a and 13b are exploded perspective views respectively illustrating the embodiments of FIGS. 12a and 12b.

DESCRIPTION OF PREFERRED EMBODIMENTS

Figure 1B:
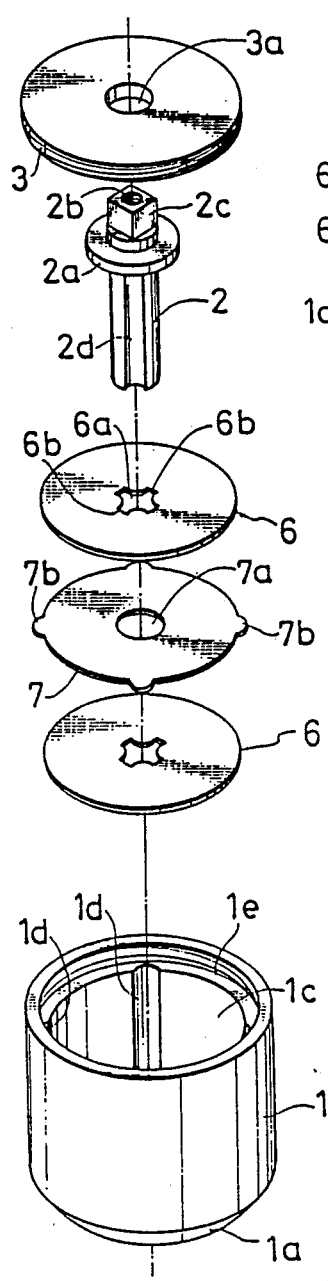
Figure 1A:
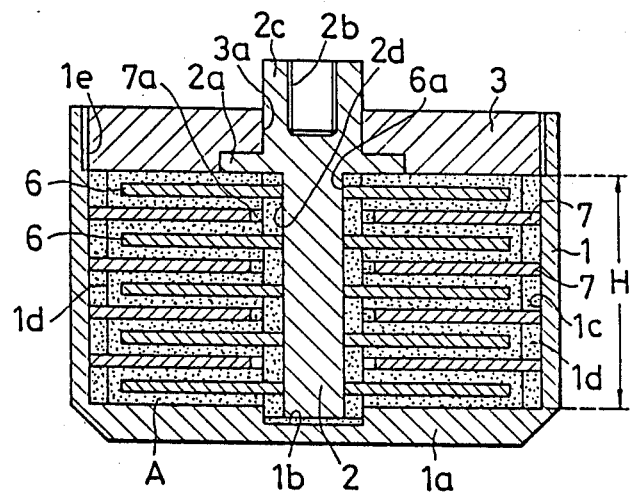
FIG. 1a is a longitudinal sectional front view showing the principal part of an embodiment of the rotary damper according to the present invention designed to achieved its first object.

A number of embodiments of the damper according to the invention designed to achieved its first object are illustrated in FIGS. 1a through 5d. of which FIGS. 1a through a 3 are illustrations of embodiments comprising plurality of movable and fixed discs, FIGS 4a and 4b are illustrations of an embodiment of traction type and FIGS. 5a through 5d are illustrations of embodiments of rotary type designed to prevent an undesired flow of viscous fluid in a stationary condition anf to urge a smooth flow of the fluid in an operating condition.

Figure 1C:
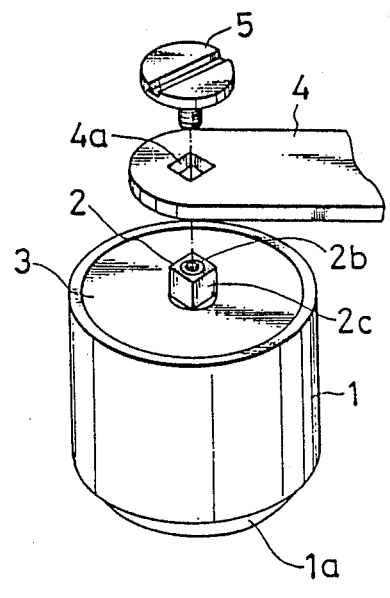
FIG. 1c is a perspective view of the embodiment of FIG. 1a, illustrating the stage where it is almost assembled.

Now referring to the embodiment of FIGS. 1a through 1c of the rotary multi-disc damper, cylindrical casing 1 is provided with bearing recess 1b at the bottom 1a and symmetrically arranged vertical grooves 1d, 1d, . . . on an inner surface 1c.

A rotary shaft 2 is rotatably arranged along the longitudinal axis of said casing 1 and its front end is engaged into said bearing recess 1b, while cover plate 3 is screwed into the upper threaded portion 1e, of the casing 1 from above a flange 2a provided on the upper section of the rotary shaft 2 so that a squared top portion 2c located above the flange 2a and provided with coupling threaded bore 2b from said cover plate 3.

The projecting section of said squared top portion 2c comes into engagement with a square bore 4b of a rotary arm 4 which is subjected to external turning force. A holder screw 5 comes into engagment with coupling threaded bore 2b to hold said arm 4 against disengagement.

The casing 1 which is sealed by a cover plate 3 contains viscous fluid A of a viscous high-molecular material such as polyisobutylene or other viscous material such as pitch or sticky water glass as well as movaable discs 6, 6, . . . and fixed discs 7, 7, . . . which are vertically and alternatively arranged in a manner as described below.

Movable disc 6 is a disc having a central opening 6a that comprises notches 6b, 6b, . . . which come into engagement with ridges 2d, 2d, . . . provided vertically on the lateral surface of said rotary shaft 2 so that said movable disc 6 rotates with rotary shaft 2 and can slidingly move in the axial direction or, in FIG. 1a, upward or downward.

The fixed disc 7 has a circular opening 7a at the center and symmetrically arranged holder projections 7b, 7b, . . . on its circumference. Since the rotary shaft 2 idly runs through opening 7a, the turning movement of rotary shaft 2 is not transmitted to fixed disc 7. Moveover, since said holder projections 7b, 7b, . . . are engaged with vertical ridges 1d, 1d, . . . of casing 1, it is not affected by the turning force or turbulence of the viscous fluid, while it can be slidingly moved in the axial direction like movable disc 6. Reference symbol 3a denotes a central bore of the cover plate 3 for receiving the rotary shaft.

Now suppose that a rotary damper as described here is used as a door check. When an external turning force is applied to the rotary arm 4, the rotary shaft 2 and accordingly movable discs 6, 6 . . . turn in response. This movement generates a viscous drag against shearing force within viscous fluid A found in the clearances between the discs, which, along with the alignment effect as described earlier, deflects the disc axially in such a manner that all the clearances between the discs tend to be equalized. Consequently, the discs within the casing are arranged parallel to each other to evenly divide the total effective length of the casing 1.

Figure 5A:
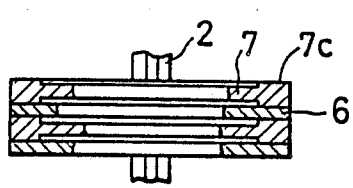
FIG. 5a is a partial sectional front view of an embodiment using fixed discs of different design.
Figure 5C:
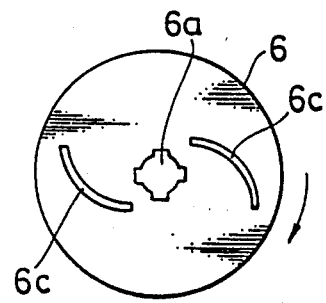
FIG. 5c is a plan view showing a disc of different design.
Figure 5B:
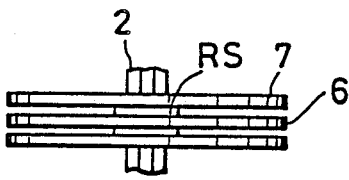
FIG. 5b is a partial sectional front view of an embodiment using ring spacers.

Now referring to the embodiments illustrated in FIGS. 5a through 5d, of which FIG. 5a shows an embodiment using the fixed disc 7 having thickened circumferential portion 7c while FIG. 5b shows an embodiment using a ring spacer RS between fixed disc 7 and movable disc 6, these embodiments being provided with a preventive measure against falling down of the discs due to their own weight while they are not in use. Otherwise, all the viscous fluid will be pushed away to move into the outer space of the discs as the discs fall down and the viscous drag against shearig force will not be effectively and rapidly generated within the viscous fluid when an external force is applied to the damper.

Figure 5D:
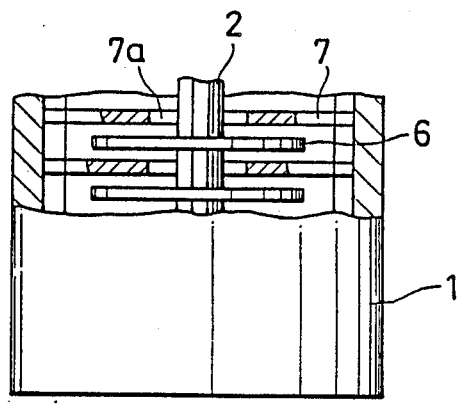
FIG. 5d is a partial sectional front view illustrating another embodiment.

FIG. 5c shows an embodiment where arc-shaped slits 6c, 6c are formed on movable disc 6, which accelerate the flow of viscous liquid from the circumferential area to the central area of the casing when the disc is turned in the direction of the arrow with rotary shaft 2 in order to ensure a smooth movement of viscous liquid A among the discs. FIG. 5d illustrates an embodiment where a relatively large central bore 7a of the fixed disc 7 and the movable disc 6 having a relatively small outer diameter are realized to enhance the mobility of viscous fluid A in order to ensure a rapid substantiation of the alignment effect.

FIGS. 2 and 3 illustrate two other embodiments, of which the embodiment of FIG. 2 has a configuration for the rotray shaft and the related components with differs from that of FIG. 1 in the following manner.

Namely, in this embodiment, rotary shaft 2 is not realized in one-piece but actually a collection of central shaft 2e and eccentric shaft 2f, 2f, which are separately and respectively held in opening 6d for central shaft 2d and openings 6e, 6e for eccentric shafts 2f, 2f corresponding collectively to central opening 6a of the embodiment of FIG. 1. Therefore, the turning movement of rotary shaft 2 is transmitted to the movable disc 6 by means of these three shafts. Circular opening 7a of fixed disc 7 of this embodiment has a diameter large enough to loosely and collectively accomodate a central shaft 2e and eccentric shafts 2f, 2f.

The embodiment of FIG. 3 also has a configuration for rotary shaft 2 and the related components which are different from its counterparts in the other embodiments. In this embodiment, a rotary shaft 2 has notches 2h, 2h, ... on the periphery of a flange 2a formed on a shaft body 2g comprising squared top portion 2c. These notches come into engagement with teeth 6f, 6f, ... standing upward from the circumference of the central opening of the uppermost movable disc 6, while notches 6g, 6g, ... provided between teeth 6f, 6f, ... and standing upward from the circumference of the central opening of the movable disc 6 immediately below the uppermost disc 6 come into engagement with teeth 6f, 6f, ... of the movable disc 6 immediately below said second disc 6. In a similar manner, a number of movable discs are engaged with one another so that the turning movement of shaft main body 2g is successively transmitted down to the lowermost movable disc. Needless to say, teeth 6f, 6f, ... are realized with such dimensions and form that the teeth can freely pass through circular opening 7a of fixed disc 7.

Whereas the above embodiments are designed to receive external rotating force, the embodiment in FIGS. 4a and 4b is designed to generate a viscous drag against shearing force when an external force is applied to rotary shaft 2 to tract it in the linear direction.

In this embodiment, casing 1 comprises main body 11a and an auxiliary body 11b to be held by the two lateral edges of the main body and a threaded cap 11e to be screwed on the mouth portion of the casing when mouth halves 11c, 11d formed respectively on the top of bodies 11a, 11b are put together. Said threaded cap 11e has shaft bearing bore 11f formed in the centre, by which movable shaft 2 is slidably held. A joint 2j is pivotably fitted to the end of a rotary shaft 2 in the casing 1 by means of a shaft pin 2i as shown in FIG. 4a.

Said joint 2j comprises a pair of bearing pieces 2k, 2k and horizontal piece 21 that connects them. A guide pin 2m is horizontally carried by said bearing pieces 2k, 2k at the lower portion thereof and movable plate 6, 6, ... are suspended from said guide pin as it runs through a guide holes 6h provided on the upper portion of each movable plate 6. With such an arrangement, movable plates 6, 6 ... can be deflected laterally, or either to the right or to the left of the drawing.

Fixed plates 7, 7, ... are provided in casing 1 in an alternative arrangement with movable plate 6, 6, ... In these embodiments, both fixed plates and movable plates have a rectangular form, although fixed plates 7, 7, ... have lateral projections 7b', 7b', ... which come to engagement with horizontal grooves provided on the inner side walls of casing 1 to block vertical movement of the fixed plates. It may be apparent that the fixed plates are laterally deflectable as movable plates 6, 6, ... . As seen from FIG. 7d, fixed plates 7, 7, ... have a cut-off area on the upper portion thereof designed to avoid contact between the guide pin 2m and the fixed plates. All the space within casing 1 is filled with viscous fluid A.

Now suppose that movable shaft 2 of FIG. 4a is pulled upward by an external force, suspended movable plates 6, 6, ... are also moved upward linearly. Then thanks to the alignment effect, the clearances between adjacent plates of movable plates 6, 6, ... and fixed plates 7, 7, ... tend to be equalized and total effective length H of the damper, or the distance betweeen two bearing piece 2k, 2k, in FIG. 4a, is equally divided by movable plates, 6, 6, ... and fixed plates 7, 7, ... so that an evenly distributed viscous drag against shearing force is generated in the viscous fluid filling the space within the damper. Referring to the embodiment illustrated in FIGS. 6a and 6b which is designed to achieve the second object of the invention, a cylindrical casing 1 comprises a bottom wall 1a, through which rotatably runs rotary shaft 2 along the vertical axis of the damper, and an upper screw nut portion 1e, into which a cap plate 3 is screwed. Said rotary shaft 2 carries a pivotable arm 4 at its lower end, which is rigidly fitted to the rotary shaft by a holder screw 5. The casing 1 has vertical grooves 1d, 1d, ... symmetrically arranged on its inner side wall.

The space within the casing 1 is filled with viscous fluid A and the casing is sealed by the cap plate 3. A number of movable discs 6, 6, ... and fixed discs 7, 7, ... are arranged vertically alternatively arranged. Whereas, if the rotary shaft is rotated, the movable disc 6 rotates with the shaft because the disc has notches 6b, 6b around a central opening 6a which is engaged with vertical ridges 2d, 2d, ... of the rotary shaft 2, fixed disc 7 can not rotate since it is held by the casing 1 as a result of the coordinated effect of circular opening 7a, periphery projections 7b, 7b, ... and vertical ridges 1d, 1d, ... of the casing 1. It may be apparent that both the movable disc 6 and the fixed disc 7 can shift their vertical position as in the case of the embodiments related with the first object of the invention. An adjuster screw 8a screwed into a shaft bearing bore 3a of the cap plate 3 can be operated from outside for vertical adjustment. A pusher disc 8b is placed on the top of rotary shaft 2 and immediately below the cap plate 3 and its central projection 8b is accommodated in the central bore formed on the bottom of the adjuster screw 8a in such a manner that by driving the screw back and forth, the pusher disc 8b is moved back and forth, which in turn alters the total effective length of the damper defined by the distance between the bottom wall 1a of the casing and the pusher disc 8b. Said adjuster screw 8a and pusher disc 8b constitute adjuster member 8. Reference symbols 8b'', 8b'', ... in FIGS. 6a and 6b denote so many projections provided on the periphery of the pusher disc 8b to be engaged with vertical grooves 1d, 1d, ... of the casing 1 to block turning movement of the pusher disc 8b.

When a damper having a configuration as described above is used as a door check, an external turning fore applied to the pivotable arm 4 is received the damper so that all the clearances between the adjacent movable and fixed discs tend to be equalized and the total effective length H is evenly divided by the discs which become parallel to each other.

Now suppose that the damping force of the damper has to be altered. Such alteration can be realized by turning the adjuster screw 8a. If the adjuster screw 8a is turned to move forward to reduce the value of H and hence the distance between any two adjacent discs, the total viscous drag of the viscous fluid is increased to enhance the effect of the damper against the external force applied to the arm. The adjuster screw 8a can be driven forward even if the casing 1 is completely filled with viscous fluid A so long as the fluid has the physical property of being compressible. If the fluid is not compressible, a layer of air formed on the top of the fluid can accomodate the downward movement of the pusher disc 8b.

Figure 6A:
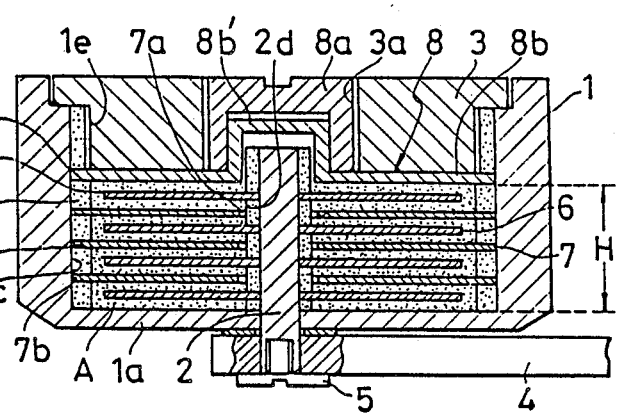
FIG. 6a is a longitudinal sectional front view showing the principal part of an embodiment of the rotary multi-disc damper according to the present invention designed to achieve its second object.
Figure 6B:
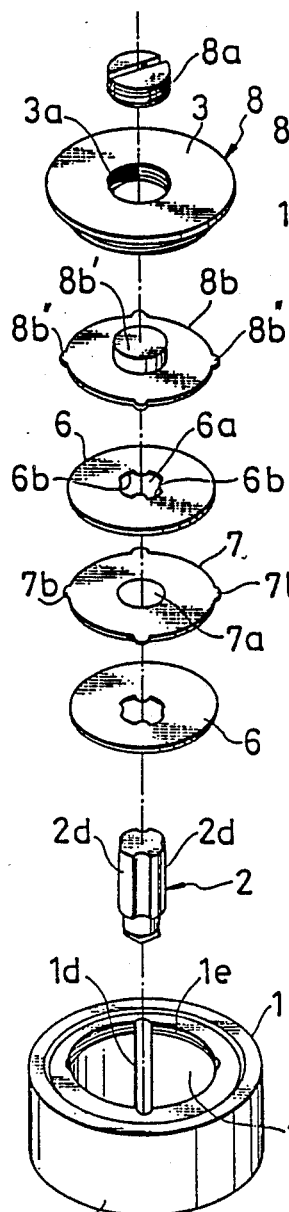
Figure 9B:
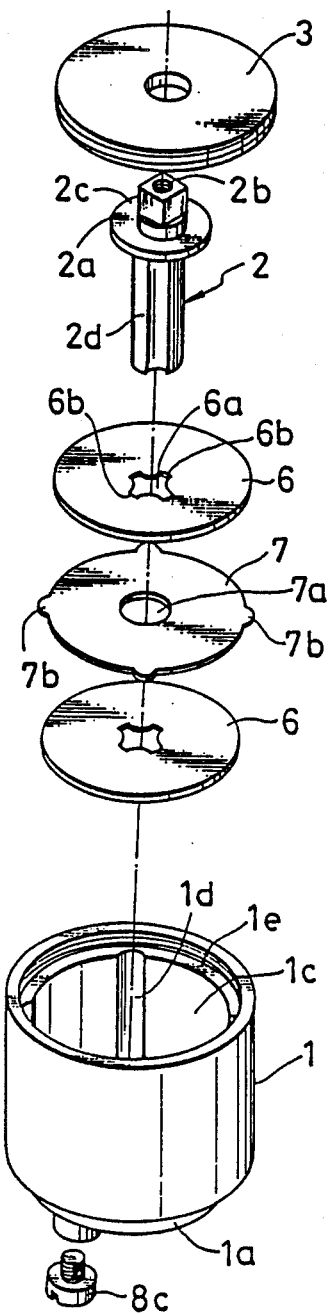
FIGS. 9a and 9b are respectively a longitudinal sectional front view and an exploded perspective view showing another embodiment of the rotary multi-disc damper according to the invention designed to achieve the second object of the invention but different from the embodiment of FIGS. 6a and 6b.
Figure 9A:
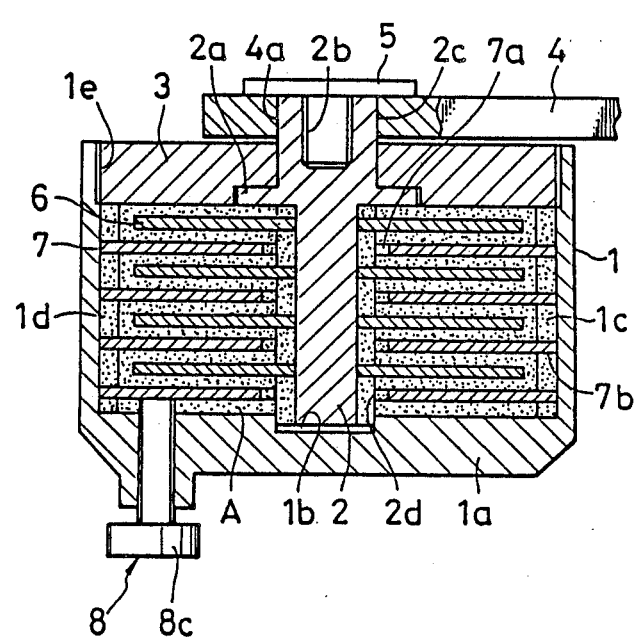

Referring now to FIGS. 9a and 9b which show another embodiment to achieve the second object of the invention, this embodiment differs from that of FIGS. 6a and 6b in that a rotary shaft 2 does not pass through the bottom wall 1a but its cap disc 3 as in the case of the embodiments described in reference to the first object of the invention. Instead, the bottom of the rotary shaft 2 is accommodated in bearing recess 1b of the bottom wall 1a. The rotary shaft 2 has a flange 2a on the upper portion thereof from which a squared top portion 2c extends upward to pass through a cap disc 3. A threaded bore 2b is axially formed in the top portion 2c.

A square hole 4a of a pivotable arm 4 is fitted onto squared top portion 2c that projects from cap disc 3 and rigidly held by a lock bolt 5 screwed into threaded bore 2b. The pivotable arm 4 is subjected to external force.

In the embodiment, an adjuster member 8 is actually an adjuster screw bolt 8c screwed into a threaded bore vertically formed at an eccentric position of the bottom wall 1c of the casing 1. The top end of the screw bolt 8c abuts the lower surface of the lowermost fixed disc 7 at a position close to the inner wall surface 1c of the casing 1.

With such an arrangement, when the adjuster screw bolt 8c is driven upward, said lowermost fixed disc 7 is pushed up to take a tilted posture and as a result the distance between the disc and the movable disc 6 located immediately above it is decreased to reduce overall effective length H of the damper and hence increase the viscous drag against shearing force to the desired degree.

Figure 7:
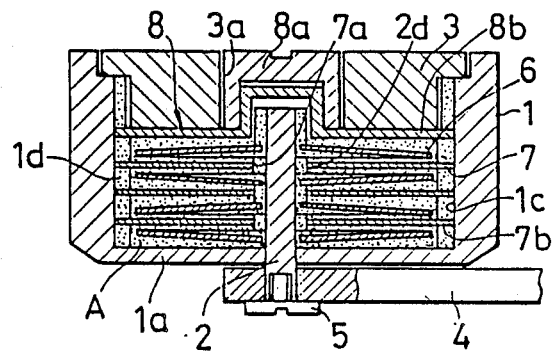
FIG. 7 is a longitudinal sectional from view showing the principal part of an embodiment of the rotary multi-disc damper according to the present invention designed to achieve its third object.

Referring to FIG. 7 which illustrates an embodiment designed to achieve the third object of the invention, this embodiment differs from that of FIGS. 6a and 6b mentioned above, in that, unlike the above embodiment, this embodiment is provided a source of resilient force 9 which serves to effectively restore total effective length H of the damper once it is reduced through operation of the adjuster member 8.

In this embodiment, source of resilient force 9 is realized by forming movable discs 6, 6, ... not as flat discs but as those having the shape of a truncated cone with height h as measured between central opening 6a and outer circumference 6a. Movable discs 6, 6, ... having such a shape are then arranged in such a manner that every other disc is reversed and all the movable discs and fixed discs are vertically lined up alternatively.

With this embodiment, if adjuster screw bolt 8a is driven forward, the pusher disc 8b is pressed down to lower the uppermost movable disc 6, which in turn presses down the disc next to it and in this manner the effect of lowering the adjuster bolt is transmitted to all the discs. As a result, the distance between the two adjacent discs are reduced and, at the same time, truncated cone-shaped movable discs 6, 6, ... are flattened to lose some of height h. However, when the adjuster screw bolt 8a is driven back, the resilient force which inherent in the truncated cone-shaped movable discs serves to quickly restore their original posture.

While the source of resilient force imparted to movable disc 6 in this embodiment, fixed disc 7 or both movable and fixed disc 7 may be utilize to provide such resilient force in a similar manner.

Figure 8A:
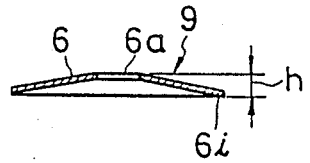
FIG. 8a is a longitudinal sectional view illustrating a movable disc of the embodiment of FIG. 7.
Figure 8B:
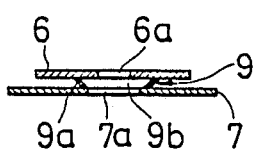
FIGS. 8b and 8c are longitudinal sectional views illustrating two movable discs to be used for two other embodiments.
Figure 8C:
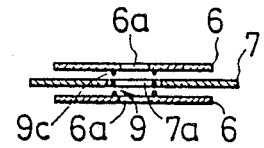

FIGS. 8b and 8c show two alternative sources of the resilient force 9. In FIG. 8b, reversed truncated cone-shaped small disc spring member 9a having central opening with a diameter larger than that of central opening 6a of movable disc 6 and that of circular opening 7a of fixed disc 7 is used as a source of resilient force and placed between adjacent movable disc 6 and fixed disc 7 with central opening 9b fitted to rotary shaft 2. In FIG. 8c on the other hand, a coil spring 9c placed between adjacent movable discs at the circumferential area of the central opening 6a of movable disc 6 provides a source of resilient force 9. In this case, the size of coil spring 9c is determined in such a manner that it does not come into contact with the periphery of circular opening 7a of fixed disc 7 but adequately held by rotary shaft 2.

While a small disc spring member 9a and a coil spring 9c provide sources of resilient force so that other components are not required to have an inherent resilient force to right itself, the overall effect using such members is quite similar to the embodiments shown in FIGS. 7 and 8a.

Figure 11:
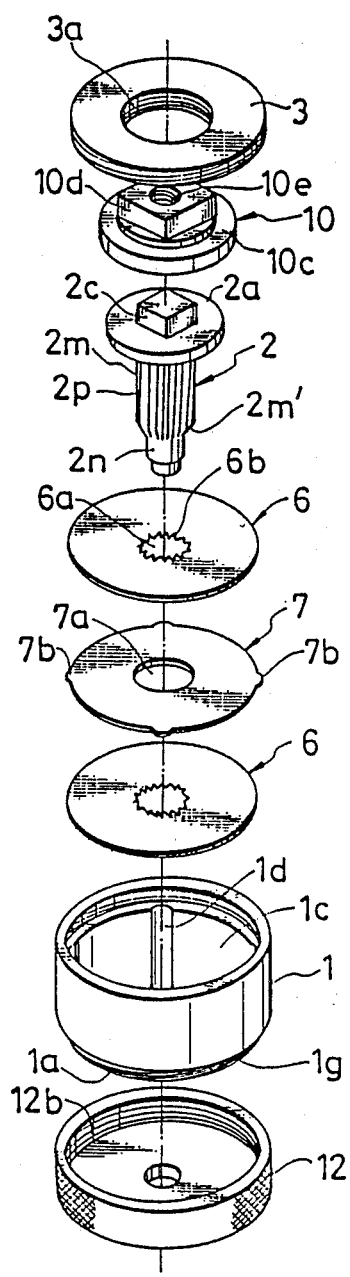
FIG. 11 is an exploded perspective view of the embodiment of FIG. 10.
Figure 10:
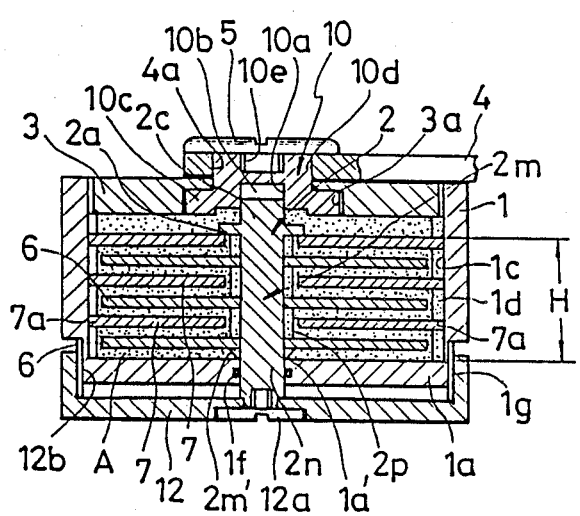
FIG. 10 is a longitudinal sectional front view showing the principal part of an embodiment of the rotary multi-disc damper according to the present invention designed to achieve its fifth object.

Referring to FIGS. 10 and 11 that illustrate an embodiment to achieve the fourth object of the invention, a casing 1 comprises vertical grooves 1d, 1d, ... on the inner lateral surface while the lower end of a rotary shaft 2 runs through the bottom wall 1a and engaged therewith by means of an O-ring 1f. A squared top portion 2c is provided on a flange 2a found at the upper portion of said rotary shaft 2 to project upward.

A cap disc 3 screwed into the casing 1 has threaded bore 3a, into which a shaft bearing connector 10 is screwed. The squared top portion 2c of the rotary shaft 2 is lodged in a shaft bearing hole 10a of said connector 10 with clearance 10b to accommodate an up and down movement thereof. The casing 1 is closed by the cap disc 3.

A squared top portion 10d provided on flange 10c of said shaft bearing connector 10 projects out of the cap disc 3 to engage with a squared hole 4a of the pivotable arm 4 which is subjected to external rotating force. A lock bolt 5 is screwed into a threaded bore 10e of a shaft bearing connector 10 to prevent an unintentional removal of the pivotable arm 4.

The lower end of the rotary shaft 2 that projects out of the casing 1 is rigidly connected with a stop bolt 12a from outside of a rotary adjuster 12. On the other hand, the rotary adjuster 12 is connected with the casing 1 as a threaded inner periphery 12b comes into engagement with a threaded outer periphery 7g of the casing 1 provided at the lower end thereof. With such an arrangement, the rotary shaft 2 can be moved up and down by driving the rotary adjuster 12 back and forth.

From the flange 2a of the rotary shaft 2 downward, a locking portion 2m and nonlocking portion 2n are successively formed on said rotary shaft 2. In the embodiment illustrated in FIG. 11, a locking portion of the rotary shaft 2 is realized by a number of teeth or vertical ridges 2p, 2p, . . . formed on the periphery of said shaft 2. The locking portion 2m has at its lower end a tapered area 2m', where each tooth or ridge gradually lose its height until it smoothly reaches a nonlocking portion 2n.

The casing 1 which is closed by a cap disc 3 is filled with viscous fluid A and movable discs 6, 6, . . . and fixed discs 7, 7, . . . are arranged alternatively therein in the vertical direction.

Movable disc 6 and rotary shaft 2 are interlocked as the locking notches 6b, 6b, . . . provided on the circumferential area of central opening 6a of disc 6 come into engagement with teeth or vertical ridges 2p, 2p, . . . of locking portion 2m of rotary shaft 2 so that the movable disc 6 is rotated in accordance with the rotary movement of the rotary shaft 2. Besides, movable disc 6 is axially deflectable or can shift its vertical position as seen in FIG. 10.

Fixed disc 7 is provided with circular opening 7a at its centre and projections 7b, 7b, . . . around the outer periphery so that, as mentioned above, it is not caused to have any rotary movement as a result of the rotary movement of the adjacent movable discs, although it can shift its axial position just like the movable disc 6.

If a damper having an arrangement as this embodiment is used as a door check, the movable discs 6, 6, . . . rotate in accordance with the movement of the rotary shaft 2 when the latter is turned in response to the external turning force applied to the pivotable arm 4. This movement in turn generates a viscous drag against shearing force in viscous fluid A found between movable discs 6, 6, . . . and fixed discs 7, 7, . . . . Then, due to the alignment effect, the movable discs 6, 6, . . . and the fixed discs 7, 7, . . . shift their vertical positions to become parallel to each other and evenly divide the total effective length H of the damper.

The overall damping effect of this damper can be adjusted by turning the rotary adjuster 12. More specifically, FIG. 10 shows a state in which tapered area 2m' is located close to tapered bore 1a' formed in bottom wall 1a of the casing 1. Now, if the rotary adjuster 12 is driven upward, the tapered area 2m' is gradually moved up and away from the bottom wall 1a and consequently nonlocking portion 2n of the shaft is moved into the casing 1. Then eventually the lowermost movable disc 6 in casing 1 comes off from the locking portion 2m to a position that surrounds the non-locking area 2n.

Under this condition, the rotary movement of the rotary shaft 2 is not transmitted to said lowermost movable disc 6 and therefore excluded from the rest of the movable discs in the sense that it does not take part in the function of generating visous drag against shearing force to, as a result, decrement the overall damping effect of the damper.

If the rotary adjuster 12 is further driven up, eventually the next movable disc 6 also comes off from the locking portion 2n of the rotary shaft 2 to further decrement the damping effect of the damper.

To the contrary, if the rotary adjuster 12 is driven back to move the rotary shaft 2 downward, the movable discs 6, 6, . . . that have been disengaged from the locking portion 2m come one by one back to the position where notches 6b, 6b, . . . of central opening 6a of a restored movable disc 6 are engaged with teeth 2p, 2p, . . . of locking portion 2m of the rotary shaft 2 to increment the damping effect of the damper, or the position as shown in FIG. 10.

FIGS. 12a, 12b, 13a and 13b illustrate two embodiments of the present invention designed to achieve the fifth object of the invention, which have basically a similar configuration as the embodiment shown in FIGS. 1a through 1c with reference to the first object of the invention and hence similar components are indicated by identical reference symbols. However, this embodiment further comprises one or more deformable feeler elements 13 within a casing 1.

Figure 12:
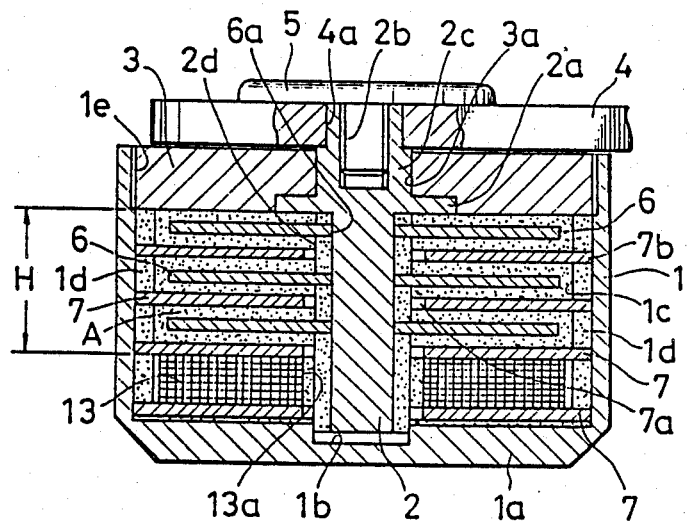
FIGS. 12a and 12b are longitudinal sectional front views showing two other embodiments of the damper according to the present invention designed to achieve its fifth object.
Figure 12:
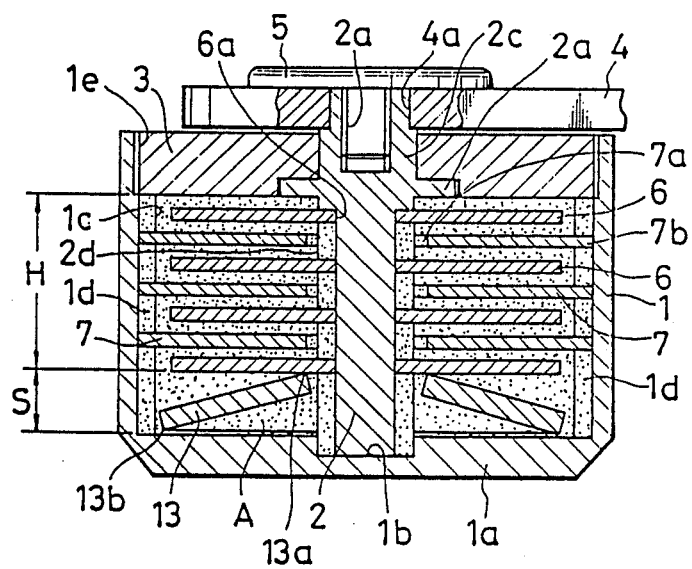

While the embodiment of FIGS. 12a and 13a has a deformable feeler element 13 made of silicone rubber having the shape of a disc with a large central bore 13a, the embodiment of FIGS. 12b and 13b contains a deformable feeler element 13 made of bimetal also having the shape of a disc with a large central bore 13a, which is warped into a dish-like form when heated. A rotary shaft 2 runs idly through a central bore 13a. A deformable feeler element 13 may be located either on the bottom of the casing 1 between bottom wall 1a and the lowermost fixed disc 7 or between the lowermost fixed disc 7 and the fixed disc 7 next to it. Aternatively, the deformable feeler element 13 may be located immediately under a cap disc 3 or between any arbitrarily selected adjacent movable disc 6 and a fixed disc 7. Moreover, the number of the deformable feeler element 13 is not necessarily limited to one but more than one elements may be appropriately used at multiple locations within the casing.

It is well known that silicone rubber is deformed by the change of the ambient temperature, expanding to increase its volume when the ambient temperature rises and contracting to decrease its volume when the temperature falls.

On the other hand, a deformable feeler element made of bimetal is warped by temperature rise to take on a dish-like form, or a bowl-like form in an extreme case, so that, when heated, height S of the element defined by the vertical distance between central opening 13a and outer circumference 13b becomes significantly large.

Therefore, if said deformable feeler element 13 is provided within a damper, the element increases its thickness, in the case of silicone rubber, by the temperature rise as often observed in summer to push up the lowermost fixed disc 7, which in turn moves the adjacent disc upward so that eventually the total effective length H of the damper comprising movable disc 6, 6, . . . and the fixed disc 7, 7, . . . becomes decreased.

Consequently, the clearance between any two adjacent discs is narrowed and therefore the reduction of viscosity of viscous fluid A due to the temperature rise can be compensated by the increased drag against shearing force due to the reduced clearance between the movable disc and the fixed disc. Thus, a damper having a structure as that of this embodiment can constantly maintain its desired damping effect regardless of fluctuation of temperature all the year round.

Figure 14A:
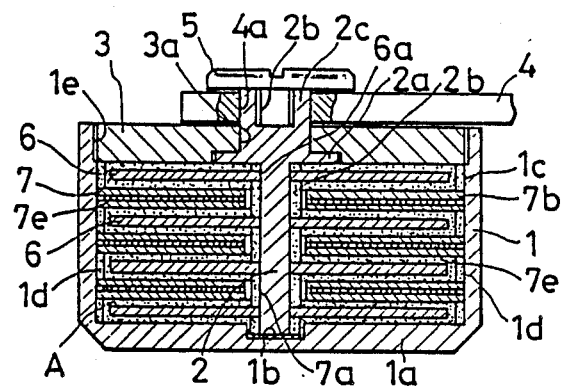
FIGS. 14a, 14b and 14c are longitudinal sectional front views of three different embodiments of the damper according to the present invention designed to achieve its sixth object.

FIGS. 14a through 15c illustrate three different embodiments of the invention to achieve the sixth object of the invention. The arrangement of these embodiments is basically similar to that of the embodiment for the first and the fourth objects and therefore similar components are indicated by identical reference symbols. Now the embodiment illustrated in FIGS. 14a and 15a is different from those embodiment only in that a fixed disc 7 is realized by bonding two disc elements, each having central circular opening 7a and projections 7b, 7b, . . . provided on the outer periphery, with deformable feeler member 7e made of silicone rubber or a similar material sandwiched therebetween.

Figure 14B:
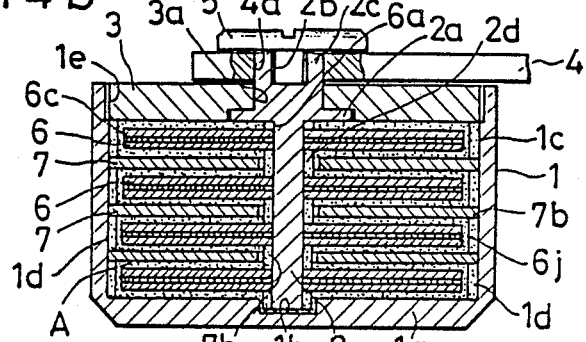
Figures 15A, 15B, 15C:
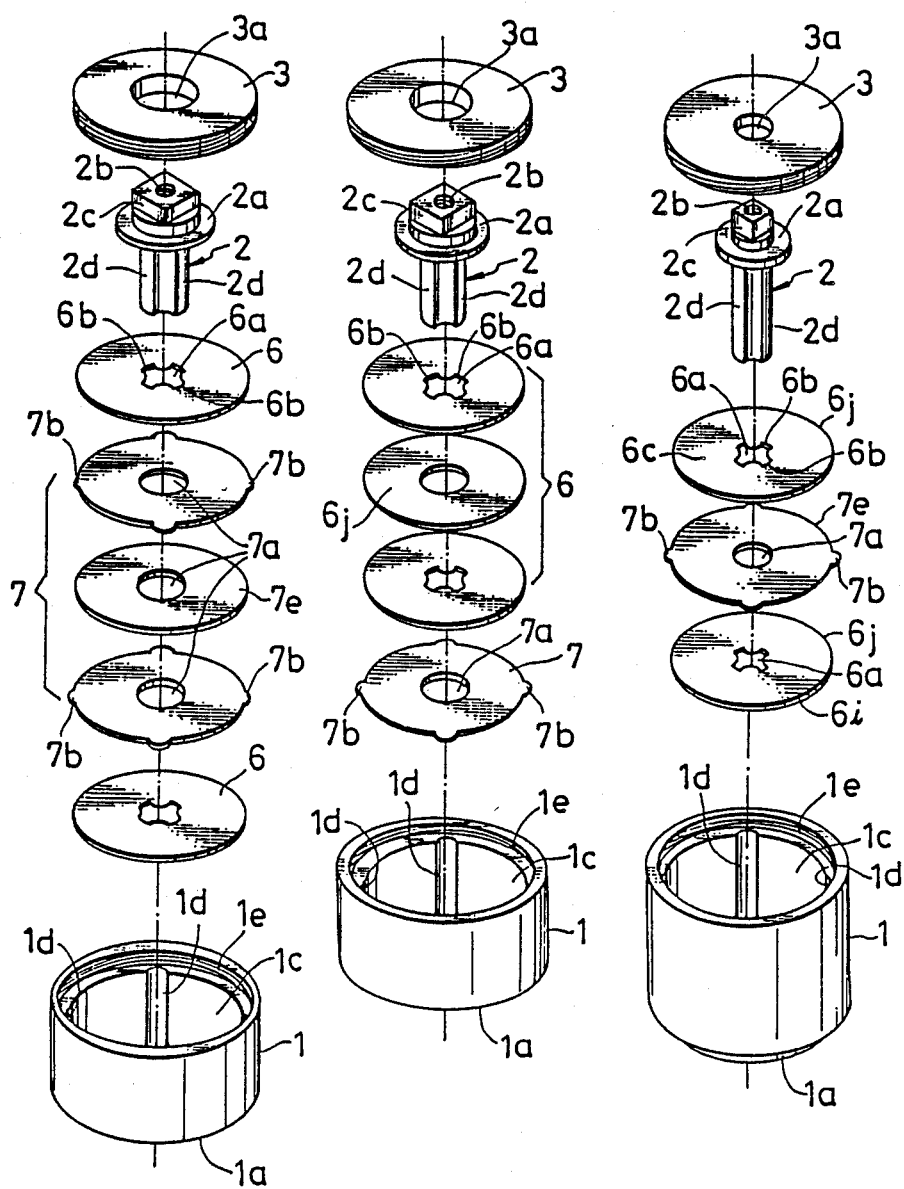
FIGS. 15a, 15b and 15c are exploded perspective views respectively illustrating the embodiments of FIGS. 14a, 14b and 14c.

The embodiment illustrated in FIGS. 14b and 15b comprises, as opposed to the above embodiment, a movable disc 6 realized by bonding two disc elements together with a deformable feeler element 6j of silicone rubber or a similar material sandwiched therebetween and provided with a common central opening 6a, while fixed disc 7 is a simple one-piece disc having a central circular opening 7a and peripheral projections 7b, 7b, . . .

While in the above two embodiments, all the movable discs and fixed discs respectively have identical structures comprising deformable feeler element 6j and 7e, it is possible to make them to have respectively only part of the movable discs and the fixed disc comprising the deformable feeler elements 6j and 7e.

It is well known that silicone rubber is laterally deformed in response to temperature change, increasing its volume as temperature rises and decreasing its volume as temperature falls.

Figure 14C:
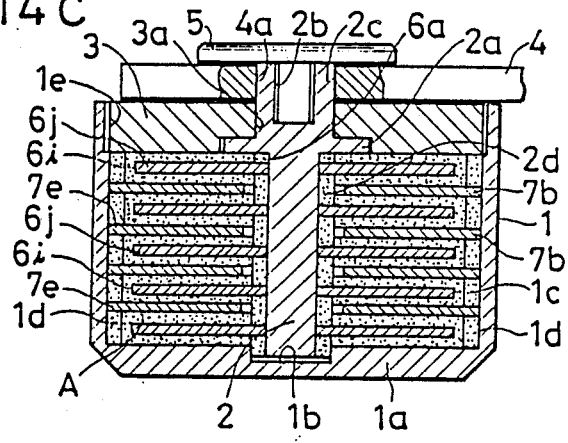

In the embodiment illustrated in FIGS. 14c and 15c, both or either and all or part of movable discs 6 and fixed discs are realized with the deformable feeler element 6j or 7e contained therein. FIG. 14c shows a state where all the movable discs 2 have the form of flat disc which is perpendicular to a movable shaft 2. However, if temperature rises, movable discs 6, 6, . . . that contain bimetal are warped to take on a dishlike shape to present a conical longitudinal sectional view and increase the height, or the thickness, defined by the vertical distance between the central opening 6a and the outer periphery 6i.

Thus, if a multi-disc damper having a design as described above is used as a door check and an external force is applied to a pivotable arm 4, it not only functions in the same manner as the embodiments realized for the first object of the invention, but maintains total effective length H as all the discs keeps their parallel relationship.

With a damper having such a construction, where silicone rubber is used for deformable feeler element 6j and/or element 7e, the elements increase the thickness as temperature rises particularly in summer and in turn both or either of movable discs 6, 6, . . . and fixed discs 7, 7, . . . increase the thickness to narrow the clearances between them. Consequently, if the viscosity of viscous fluid A is reduced to decrease the overall drag effect of the damper as a result of temperature rise, the narrowed clearance tends to compensate the reduced viscous drag against shearing force and therefore maintain the drag effect at a required level all the year round.

On the other hand, if bimetal is used for deformable feeler elements 6j or 7e, movable discs 6, 6, . . . or fixed discs 7, 7, . . . become warped to take on a dishlike form in response to the termperature rise to increase their effective thickness. Consequently, the clearance between the adjacent discs decrease to compensate the reduced drag effect as in the case of those using silicone rubber.

Figure 16:
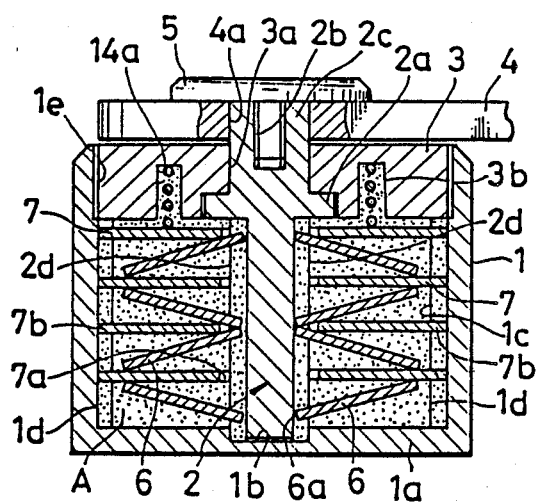
FIG. 16 is a longtudinal sectional front view showing the principal part of an embodiment of the damper according to the present invention designed to achieve its seventh object.
Figure 17:
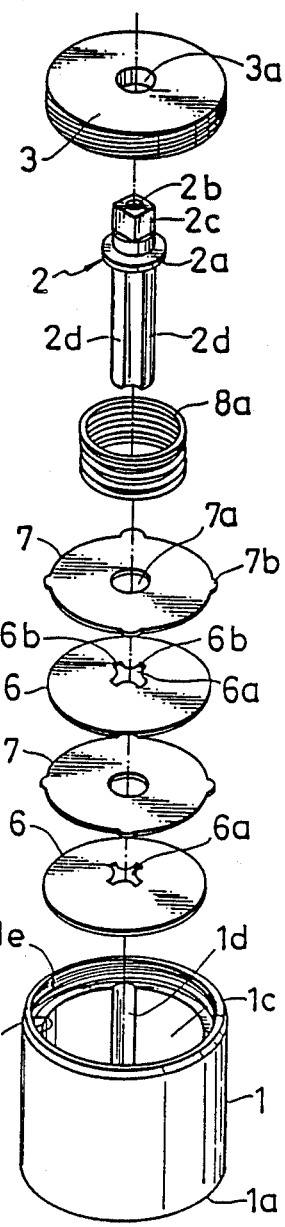
FIG. 17 is an exploded perspective view of the embodiment of FIG. 16.
Figure 19:
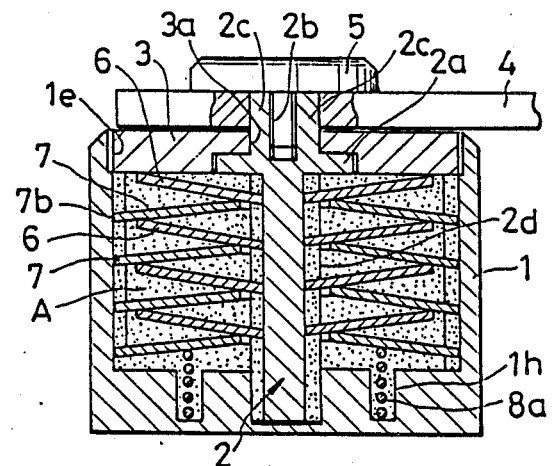
Figure 20:
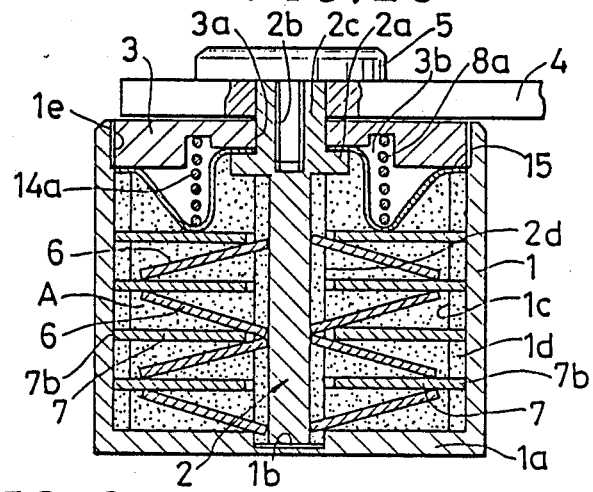
Figure 21A:
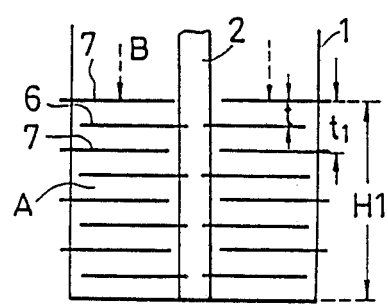
FIGS. 21a and 21b are schematic front views illustrating the inside of the damper of FIG. 16 respectively when ambient temperature is high and when temperature is low.
Figure 21B:
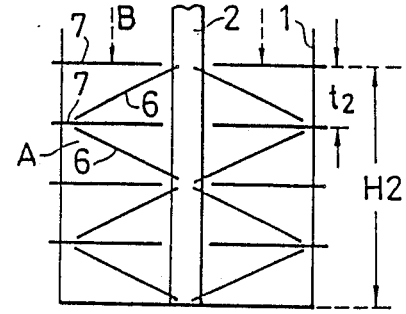
Figure 22:
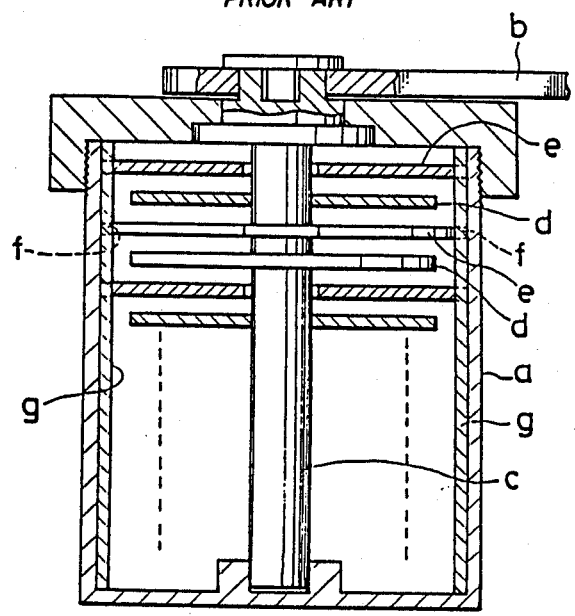
FIGS. 22a and 22b are respectively a longitudinal sectional front view and a lateral sectional view of a conventional damper using viscous fluid.
Figure 22:
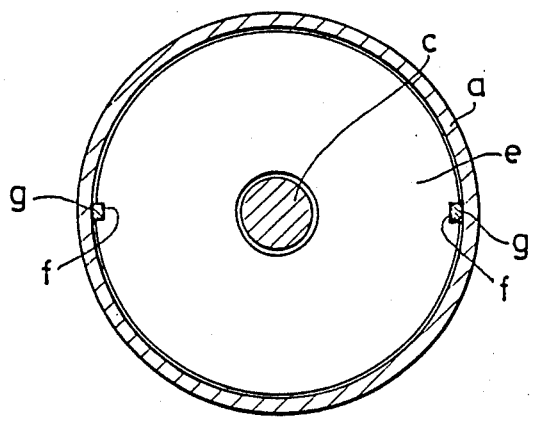

Referring to FIGS. 16 through 21b illustrating embodiments designed to achieve the seventh object of the invention, these embodiments differ from those described in reference to the first object, in that they are designed to address the situation where they are subjected to external resilient force B constantly applied to the movable discs 6, 6, . . . and the fixed discs 7, 7, . . . in the axial direction as schematically illustrated in FIGS. 21a and 21b. Thus, the embodiment illustrated in FIGS. 16 and 17 is provided with a compressed coil spring 14a received in a circular groove formed on the lower surface of a cap disc 3, said spring 14a having its lower end pressed against the uppermost fixed disc 7.

Figure 18:
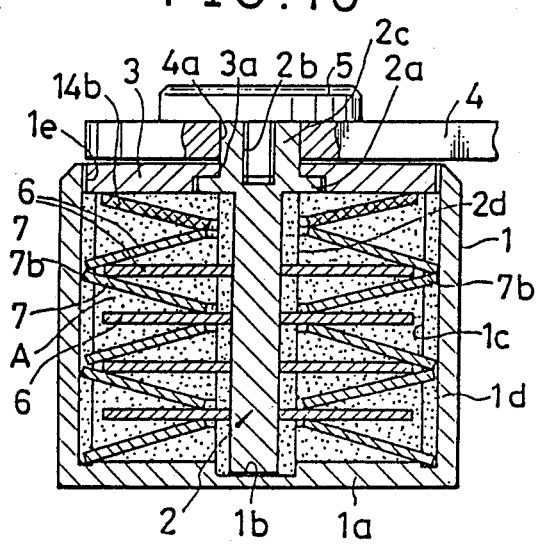
FIGS. 18, 19 and 20 are longitudinal sectional front views of three other embodiments.

The embodiments respectively illustrated in FIGS. 18, 19 and 20 differ from the above embodiment with regard to the manner of receiving external force and the way that bimetal is employed. This will be described below.

While the embodiment of FIG. 16 has a spring coil as the source of external force, the embodiment of FIG. 18 has a inversed trancated conical-shaped spring 14b located between the cap disc 3 and the uppermost movable disc 6 as the source of resilient external force. The rest of the movable discs 6, 6, . . . are simple one-piece discs, while fixed discs 7, 7, . . . are made of bimetal.

The embodiment of FIG. 19 has a compressed coil spring 14a received in circular groove 1h formed in bottom wall 1a of casing 1, said coil spring 14a having its upper end pressed against the lowermost fixed disc 7 made of bimetal. In this embodiment, all the movable discs 6, 6, . . . and the fixed discs 7, 7, . . . are made of bimetal and therefore take on a conical shape when ambient temperature falls.

The embodiment of FIG. 20 has movable discs 6, 6, . . . and compressed coil spring 14a received by a circular groove 3b as the source of resilient external force B as in the case of the embodiment of FIG. 16. However, this embodiment further comprises a circular elastic sheet 15 of rubber arranged between said spring 14a and the uppermost fixed disc 7. Said circular elastic sheet 15 is held at the edge of its inner opening between movable shaft 2 and the cap disc 3 and at the edge of its outer periphery between the cap disc 3 and the casing 1.

Thus, if a multi-disc rotary damper having a structure as any one of these embodiments is used as a door check, it not only exerts its damping effect against the rotating external force applied to the pivotable arm 4, but also presents a feature of maintaining its damping effect at a required level all the year round in the manner as described below.

FIG. 21a schematically illustrates the state of the inside of the damper when ambient temperature is relatively high as in summer and therefore all the discs are found almost in parallel to each other. Now, if ambient temperature falls as in winter, both or either and all or part of the movable discs 6, 6, . . . and the fixed discs 7, 7, . . . made of bimetal, whichever the case may be, come to be deformed to take on a conical shape, since the discs are so designed that the total effort of the deformed discs surpasses the resilient external force applied by compressed coil spring 14 or some other means. FIG. 21b illustrates a case where movable discs 6, 6, . . . are made of bimetal and therefore they take on a conical shape. Consequently, the distance between two adjacent fixed discs varies from t1 or the value as shown in FIG. 21a to t2 or the value shown in FIG. 21b, shifting the total effective length from H1 to H2. Therefore, the average distance t between the adjacent movable disc and the fixed disc is increased to offset the increase of viscous drag against shearing force due to the increased viscosity of viscous fluid A caused by the temperature fall in winter and thus the overall damping effect of the damper will be maintained at a constant level.

Again in summer when ambient temperature rises, movable discs 6, 6, . . . return to a flat state and movable discs 6, 6, . . . as well as fixed discs 7, 7, . . . are pressed axially downward by resilient external force B to decrease the overall effective height of the damper from H2 to H1 and distance t between two adjacent fixed discs from t2 to t1 so that the state shown in FIG. 21b returns to the state shown in FIG. 21a. Under this condition, while viscous fluid A loses some of its viscosity because of decline of temperature in winter, the loss is compensated by the increased viscous drag against shearing force due to the narrowed distance between the adjacent discs.

POTENTIAL INDUSTRIAL APPLICATIONS

As described earlier, a damper according to the present invention and realized to achieve the first object thereof has movable discs and fixed discs which are axially deflectable so that they can exploit the alignment effect highly advantageously to obtain a reliable viscous drag against shearing force without causing any significant local stress that can damage the components such as disc members and any rise of internal pressure of the viscous fluid contained within the damper. Because of these advantages, such a multi-disc damper can be manufactured at a reasonably low cost.

If a damper having a stucture as described above is required to modify its viscous drag against shearing effect, such modification can be realized by simply altering the number of discs used in the damper without necessity of replacing them with those of a different size.

A damper according to the present invention that achieves the second object thereof has, beside the features as described above with reference to the damper achieving the first object of the invention, a feature of modifying its viscous drag against shearing force by quickly altering the total effective length of the damper through simple operation of adjuster member from outside.

A damper according to the present invention and realized to achieve the third object thereof further comprises a source of resilient force which ensures a minimum distance between the adjacent movable and fixed discs so as to completely eliminate a condition where viscous fluid becomes nonexistent between discs as a result of flow out of the fluid and hence no sufficient viscous drag can be generated when an external force is applied to the damper. Because of said source of resilient force, a damper of this type affords quick and smooth modification including fine adjustment of its drag by means of an adjuster member.

A damper according to the present invention and realized to achieve the fourth object thereof has, beside the features of a damper described with reference to the first object of the invention, a feature of modifying the viscous drag against shearing force of the damper through operation of driving back and forth an adjuster screw to move up and down the rotary shaft of the damper that can be conducted from outside in a simple and quick manner which has not been possible to date.

A damper according to the present invention and realized to achieve the fifth object thereof has, beside the features described with reference to the first and fourth objects of the invention, a feature of making the damper capable of maintaining a required level of drag regardless of fluctuation of ambient temperature because of deformable feeler elements it comprises beside said axially deflectable, movable and fixed discs. Therefore, if such a damper is used, a situation where a required drag against shearing force is not available will be completely eliminated.

A damper according to the present invention and designed to achieve the sixth object thereof comprises axially deflectable movable and fixed discs, all or part of which are made of a material which is deformed in response to temperature change with a view to eliminate a condition where a required level of drag is not obtainable because of change of ambient temperature.

A damper according to the present invention and realized to achieve the seventh object thereof comprises axially deflectable movable and fixed discs made of bimetal which are constantly subjected to an external force. A damper having such a design can effectively maintain a required level of viscous drag against shearing force all the year round because the total effective axial length of the damper can be modified to significantly alter the distance between the adjacent discs. Such a damper is totally free from the drawbacks of conventional dampers.

What is claimed is;

1. A multi-disc damper using viscous fluid comprising within a casing a number of movable discs provided on a rotary shaft capable of being rotated by external force so as to be rotated with the shaft; a number of fixed discs not interlocked with the rotary shaft for being free of rotary movement and arranged in an alternating arrangement with the movable discs; a viscous fluid material filling the space between the movable and the fixed discs; wherein said fixed discs are not rotatable around the rotary shaft due to engagement with the casing but are axially deflectable and the movable discs are also axially deflectable; and means, provided on said rotary shaft, for adjusting the overall drag of the damper; said adjusting means successively engaging, and thereby rotating, said movable discs so that the overall drag of the damper varies according to the number of movable discs engaged.

2. A multi-disc damper using viscous fluid comprising within a casing a number of movable discs provided on a rotary shaft capable of being rotated by external force so as to be rotated with the shaft, a number of fixed discs not interlocked with the rotary shaft for being free of rotary movement and arranged in an alternative arrangement with the movable discs and a viscous fluid material filling the space between the movable and the fixed discs, wherein said fixed discs are not rotatable around the rotary shaft due to the engagement with the casing but axially deflectable and the movable discs are also axially deflectable, said rotary shaft being provided with a locking portion having vertical ridges to be engaged with the movable discs to prevent rotary movement thereof and a nonlocking portion passing through the casing, the rotary shaft being made axially movable by means of a rotary adjusting member provided on the casing and coupled to said nonlocking portion so that the nonlocking portion goes into or comes out of the casing according to the axial movement of the rotary shaft in such a manner that the movable discs can come off from the locking portion one by one starting from the one situated close to the nonlocking portion or inversely come into engagement with the locking portion in accordance with the movement of the rotary shaft.

3. A multi-disc damper using viscous fluid according to claim 2, wherein the locking portion is formed in a number of vertical ridges provided around the peripheral surface of the rotary shaft for engagement with the notches provided around the central opening of the movable discs and said ridges are tapered at the lowest area thereof toward the nonlocking portion.

* * * * *